(12) United States Patent
Liljesater

(10) Patent No.: US 12,130,184 B2
(45) Date of Patent: Oct. 29, 2024

(54) ARRANGEMENT AND METHOD FOR MEASURING THE TEMPERATURE OF A WEB, AS WELL AS A METHOD FOR PERFORMING THE STEPS OF THE MEASURING THE TEMPERATURE

(71) Applicant: Ircon Drying Systems AB, Vanersborg (SE)

(72) Inventor: Fredrik Liljesater, Vanersborg (SE)

(73) Assignee: IRCON DRYING SYSTEMS AB, Vanersborg (SE)

( * ) Notice: Subject to any disclaimer, the term of this patent is extended or adjusted under 35 U.S.C. 154(b) by 410 days.

(21) Appl. No.: 17/617,213

(22) PCT Filed: Jun. 16, 2020

(86) PCT No.: PCT/SE2020/050628
§ 371 (c)(1),
(2) Date: Dec. 7, 2021

(87) PCT Pub. No.: WO2020/256626
PCT Pub. Date: Dec. 24, 2020

(65) Prior Publication Data
US 2022/0236118 A1    Jul. 28, 2022

(30) Foreign Application Priority Data
Jun. 18, 2019   (SE) .................... 1950751-6

(51) Int. Cl.
*G01J 5/04*       (2006.01)
*D21F 5/06*       (2006.01)
(Continued)

(52) U.S. Cl.
CPC ............ *G01J 5/048* (2013.01); *D21F 7/00* (2013.01); *G01J 5/0022* (2013.01); *G01J 5/064* (2022.01);
(Continued)

(58) Field of Classification Search
CPC .......... G01J 5/048; G01J 5/0022; G01J 5/064; G01J 2005/0029; D21F 5/06
See application file for complete search history.

(56) References Cited

U.S. PATENT DOCUMENTS 5,263,839 A   11/1993  Robinson et al.
5,377,428 A    1/1995  Clark
(Continued)

FOREIGN PATENT DOCUMENTS

CN       1782223     6/2006
CN     203102580     7/2013
(Continued)

OTHER PUBLICATIONS

International Search Report dated Aug. 20, 2020 in International Patent Application No. PCT/SE2020/050628.
Written Opinion dated Aug. 20, 2020 in International Patent Application No. PCT/SE2020/050628.
(Continued)

*Primary Examiner* — Edmond C Lau
*Assistant Examiner* — Joshua M Carlson
(74) *Attorney, Agent, or Firm* — Vierra Magen Marcus LLP

(57) ABSTRACT

The present invention relates to an arrangement (1) for measuring the temperature of a web. The arrangement (1) comprises a plurality of sensors (3) for contactless measuring of the temperature, an elongated housing (5) intended for extending essentially along a transverse direction (T) which is transverse to the direction of movement of a web. The sensors (3) are arranged in a chamber (6) within the housing (5) and spread along the front side (7a) of the housing (5). Each sensor (3) is connected to a data bus (9) for providing information of the measured temperature to other systems and/or apparatuses. The sensors (3) are attached to a support structure (19) having at least one rotatable shaft (23) in the interior of the housing (7), and wherein the shaft (23) is (Continued)

arranged to rotate the support structure (19) such that the sensors (3) are displaced to a calibration and/or protection position away from the openings (11) for calibration and/or protection of the sensors (3). The invention also relates to a method for measuring the temperature of a web, a computer program, a computer readable medium and a control unit.

9 Claims, 3 Drawing Sheets

(51) Int. Cl.
  *D21F 7/00* (2006.01)
  *G01J 5/00* (2022.01)
  *G01J 5/06* (2022.01)
  *D21G 1/00* (2006.01)

(52) U.S. Cl.
  CPC .............. *D21F 5/06* (2013.01); *D21G 1/0073* (2013.01); *G01J 2005/0029* (2013.01)

(56) References Cited

U.S. PATENT DOCUMENTS

| | | | |
|---|---|---|---|
| 6,868,623 B2* | 3/2005 | Bjornberg | D21F 5/002 |
| | | | 34/524 |
| 7,392,715 B2* | 7/2008 | Moore | G01L 5/045 |
| | | | 73/862.55 |
| 9,121,136 B2* | 9/2015 | Aengeneyndt | D21F 5/181 |
| 2016/0160442 A1* | 6/2016 | Schmitt | G01L 5/107 |
| | | | 162/263 |
| 2019/0072507 A1 | 3/2019 | Jahn | |

FOREIGN PATENT DOCUMENTS

| | | |
|---|---|---|
| WO | 0159438 | 8/2001 |
| WO | 02088462 | 11/2002 |

OTHER PUBLICATIONS

English language Abstract for CN203102580 published Jul. 31, 2013.
English language Abstract for CN1782223 published Jun. 7, 2006.

* cited by examiner

ARRANGEMENT AND METHOD FOR MEASURING THE TEMPERATURE OF A WEB, AS WELL AS A METHOD FOR PERFORMING THE STEPS OF THE MEASURING THE TEMPERATURE

TECHNICAL FIELD

The present invention relates to an arrangement for measuring the temperature of a web. The invention also relates to a method for measuring the temperature of a web, a computer program, a computer readable medium and a control unit.

BACKGROUND

The invention is advantageously used for measuring the temperature of a web such as paper, metal sheet or textile.

In connection with the production of materials such as paper, metal sheet, textiles or the like in the form of a web, information about the web temperature is an important process parameter. Usually, the temperature varies continuously during manufacture both along and across the web. Frequently, these materials themselves have to be dried or coated with some form of coating, dyeing or impregnation which needs to be dried. Sometimes a material in the form of a web has to be heated to a certain temperature to be cured or react in other ways. Other situations where temperature information is important are in connection with the pressing of paper in the form of a web or calendering of paper. In these cases, the temperature of the web has an indirect influence on the pressure or the diameter of the calender rolls, which in turn affects the properties of the paper, for example the sheet weight or surface finish. Knowledge of the web temperature is thus important to obtain the right quality and to minimize the energy consumption during drying or heating.

Due to unevenness in the base material or coating, the temperature will vary along the length of the web and across the web. The web temperature also correlates well with the moisture content of the web, which means that the temperature information can be used to determine or control moisture content, which is another important process parameter.

It is previously known in the art to measure the temperature of a web with a contact sensor or contactlessly with pyrometers, which continuously measure the temperature of a point on the web along the direction of movement of the web. A fixed sensor can measure quickly and often, but only at a selected point on the web. A measurement across the web can be made with a thermal camera that measures a limited area of a surface or with a line scanner that has a fixed sensor with a rotating measuring head.

The disadvantage of point measurement is that a large part of the web passes without its temperature being measured and temperature variations in the transverse direction of the web are not detected. Even if the sensor would be placed in a device which mechanically moves the measuring head across the web, this would still just generate a series of point measurements. Although it is possible over time to receive information of the cross-temperature profile of the web, the measurement data is generated slowly and large surfaces of the web pass without being measured.

A line scanner is faster and thus gives better data and a smaller part of the passing web avoids measurement. The disadvantage is that it needs free visibility, usually several meters, and cannot be placed in confined spaces, which is often the case in a paper machine. Further, the environment in a process where the measuring of the temperature takes place may be severe, involving high temperatures and dirty conditions.

Hence, there is a need for an improved arrangement and method for measuring the temperature of a web, which overcomes some or all of the above disclosed disadvantages.

There is also a desire to improve the knowledge of the temperature continuously and simultaneously across substantially the whole width of the web, transversely to the direction of movement of the web.

There is yet a further need for an arrangement for measuring the temperature of a web that can be placed in confined spaces.

Another desire is also for an an arrangement for measuring the temperature of a web that is reliable although being installed in a challenging or dirty process environment and subjected to high environment temperatures.

There is further a need to measure the temperature rapidly, continuously and simultaneously across substantially the whole width of a web, and to forward the temperature information to systems and/or apparatuses such as heaters for drying or controlling the moisture content of the web.

There is also a desire to adapt the drying such that the quality of the web is improved and the properties of the produced web will be uniform.

Yet a further need is to reduce energy consumption due to unnecessary additional heating of the web.

A further desire is to identify any malfunction of the machine carrying the web, due to e.g. a defect dryer cylinder or a clogged press felt, by measuring the web temperature.

SUMMARY

An object of the invention is to provide an improved inventive arrangement and method for measuring the temperature of a web. Another object of the invention is to improve the overall quality and properties of a web during a heating and drying process. A further object is to ensure that the web temperature is measured rapidly, continuously and simultaneously across substantially the whole width of the web. Yet a further object is to improve the cost efficiency and reduce the energy consumption in the heating and drying processes of a web. Yet another object of the invention is to identify malfunctions of the machine carrying the web, by detecting temperature variations during heating and drying process of a web. Another object of the invention is to provide an arrangement for measuring the temperature of a web that can be placed in confined spaces. A further object is to improve the reliability of an arrangement for measuring the temperature of a web, even if the arrangement is positioned in a severe environment, involving high temperatures and contaminating conditions.

The objects are achieved by an arrangement for measuring the temperature of a web according to claim 1. Thus, the invention provides an arrangement comprising: a plurality of sensors for contactless measuring of the temperature, an elongated housing intended for extending essentially along a transverse direction which is transverse to the direction of movement of a web, wherein the sensors are arranged in a chamber within the housing and spread along the front side of the housing, and that each sensor is connected to a data bus for providing information of the measured temperature to other systems and/or apparatuses. The invention also provides that a plurality of openings are provided at the front side of the housing at positions for the sensors, such that each sensor is positioned adjacent an opening. Further, the sensors are attached to a circuit board which is connected to the data bus. The sensors and the circuit board are attached to a support structure having at least one rotatable shaft in the interior of the housing. Yet further, the shaft is arranged to rotate the support structure such that the sensors are displaced to a calibration and/or protection position away from the openings for calibration and/or protection of the sensors.

Since the sensors are arranged in a chamber within the elongated housing and spread along the front side of the housing, wherein each sensor is connected to a data bus, it is possible to provide an arrangement that measure the web temperature quickly, continuously and simultaneously across substantially the whole transverse direction of the web. The elongated shape of the housing allows a compact arrangement for measuring the temperature of a web that can be placed in confined spaces. By arranging the sensors and the data bus within the housing, the arrangement is reliable and can be positioned in a severe environment, involving high temperatures and dirty or contaminating conditions. An advantage is that the lifetime of the arrangement for measuring the temperature of a web is increased. By the arrangement according to the invention, the energy consumption of a heating and drying process of a web can be reduced. Since openings are provided at the positions of the sensors, other parts that are within the housing are protected from a severe environment outside the housing. By providing that the sensors are attached to a circuit board which is connected to the data bus, quick measuring can be provided as well as a rapid providing of information of the measured temperature from the sensors to other systems and/or apparatuses via the data bus. By providing that the sensors and the circuit board are attached to a support structure having at least one rotatable shaft in the interior of the housing, there is an advantage that the position of the sensors in the housing can be adjusted. A further advantage is that an automatic calibration can be included in the arrangement. Another advantage is that the sensors can be protected in the housing when not in use, e.g. during installation or disassembly.

In some embodiments, according to another aspect of the invention, a protective layer is provided in each opening adjacent each sensor within the housing. The advantage is that the protective layer eliminates the risk that dirt from a severe environment outside the housing may damage or impair the sensors.

According to yet another aspect of the invention, the protecting layer is a filter permeable for infrared temperature radiation. The advantage is that the filter can be designed to let infrared temperature radiation of some wavelengths pass the filter and block other wavelengths from reaching the sensor. The result is that the temperature measuring can be more accurate.

According to a further aspect of the invention, the filter is permeable for infrared temperature radiation within a waveband range from 8 up to 14 micrometers. The advantage is that infrared temperature radiation with other wavelengths, which may not be desirable to measure in some applications, can be blocked by filtering.

According to yet a further aspect of the invention the sensors are of pyrometer type. The advantage is the possibility to provide a rapid temperature measuring.

According to another aspect of the invention, the chamber of the housing, wherein the sensors and the data bus are arranged, is sealed from ambient air. This permits the inside of the housing to be ventilated. As a result, the arrangement can be installed in environment with relatively high ambient temperature.

According to a further aspect of the invention, the chamber of the housing is provided with an overpressure. The advantage is that components within the housing can be protected from high ambient temperature.

According to yet a further aspect of the invention the sensors are arranged closely adjacent each other along the front side of the housing such that the sensors simultaneously and continuously measure the temperature of a zone along the front side of the housing. Since the sensors are arranged close and adjacent each other within the elongated housing and spread along a front side of the housing, the arrangement may provide a measurement of the web temperature by the sensors, covering essentially every part of the web along the housing, continuously and simultaneously across the width of the web exposed to the sensors.

The objects are also reached with a method. Thus, the objects are achieved by a method for measuring of the temperature of a web from an arrangement comprising a plurality of sensors for contactless measuring of the temperature, an elongated housing intended for extending essentially along a direction transverse to the direction of movement of a web, the sensors are arranged in a chamber within the housing and spread along a front side of the housing, that each sensor is connected to a data bus, and that the sensors are attached to a circuit board which is connected to the data bus, wherein a plurality of openings are provided at the front side of the housing at positions for the sensors, such that each sensor is positioned adjacent each opening, wherein the sensors and the circuit board are attached to a support structure having a rotatable shaft in the chamber of the housing, the method comprising the steps of: positioning the arrangement essentially along the transverse direction; measuring the temperature of the moving web by the sensors; providing information of the measured temperature from the sensors to other systems and/or apparatuses via the data bus; rotating the support structure via the shaft such that the sensors are turned to a calibration position which is away from the openings; and calibrating the sensors at the calibration position.

Since the method provides that sensors are arranged in a chamber within the elongated housing and spread along a front side of the housing, wherein each sensor is connected to a data bus, it is possible to provide a reliable method that measure the web temperature quickly, continuously and simultaneously across substantially the whole width of the web. The elongated shape of the housing facilitates and provides a method for measuring the temperature of a web in confined spaces. The method for for measuring of the temperature of a web can be carried out in severe environments, involving high temperatures and dirty conditions, since the sensors and the data bus arranged within the housing. By the method according to the invention, the energy consumption of a heating and drying processes of a web can be reduced. The advantage is further that the position of the sensors in the housing can be adjusted. Another advantage obtained by doing this is that the sensors can be turned to a position away from the openings by rotation of the shaft for calibration or protection of the sensors. Further, the advantage is that an automatic calibration can be included in the arrangement. Another advantage is that the sensors can be protected in the housing when not in use, e.g. during installation or disassembly.

It should be noted that, although, in some embodiments, the method may be controlled by a control unit, in other embodiments, the method may be controlled mechanically.

Further advantages and advantageous features of the invention are disclosed in the following description and in the dependent claims.

BRIEF DESCRIPTION OF THE DRAWINGS

Below, embodiments of the invention will be described with reference to the drawings, in which.

DETAILED DESCRIPTION

The front side of the arrangement is defined as the side which is facing towards a surface intended for temperature measurement.

Figure 1:
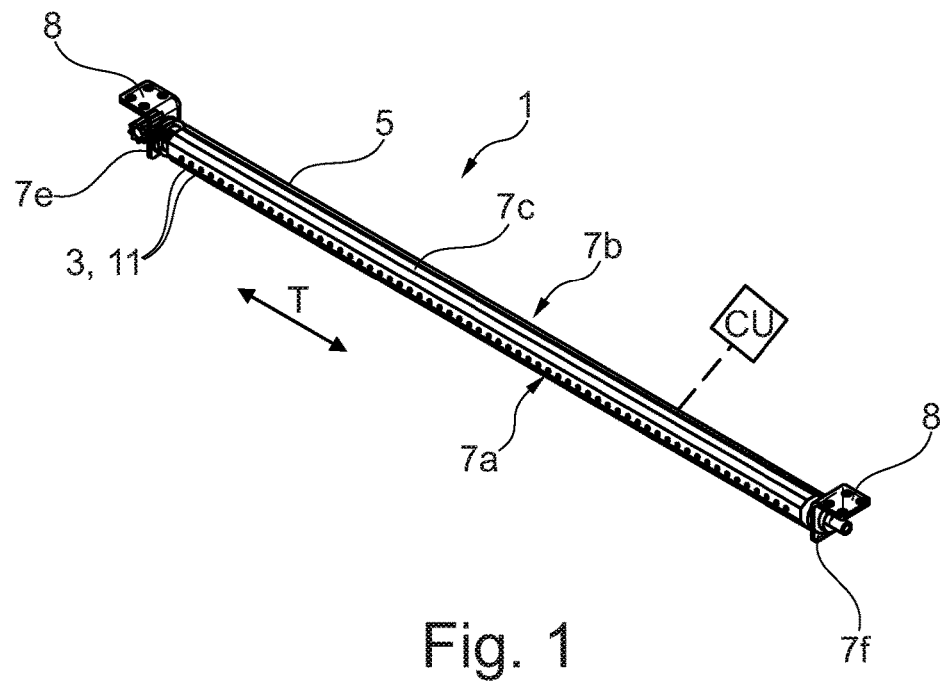
FIG. 1 shows a perspective front view of an arrangement according to an embodiment of the invention.
Figure 2:
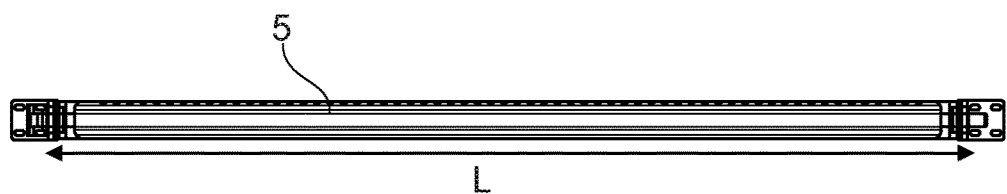
FIG. 2 shows a top view of the arrangement according to the embodiment in FIG. 1.
Figure 3:
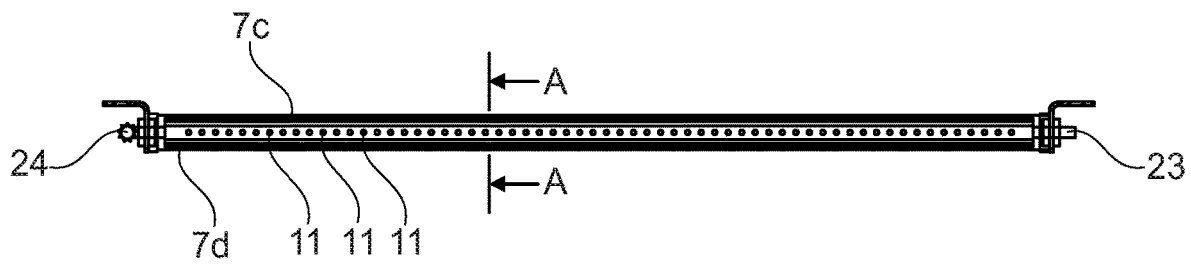
FIG. 3 shows a side view of the arrangement according to the embodiment in FIGS. 1 and 2.

FIG. 1 shows a perspective front view, FIG. 2 shows a top view and FIG. 3 shows a side view of an arrangement 1 according to an embodiment of the invention. The arrangement 1 for measuring the temperature of a web comprises a plurality of sensors 3 (a more detailed view and description follows from FIG. 4 below) for contactless measuring of said temperature. The arrangement further comprises an elongated housing 5 intended for extending essentially along a transverse direction T of the direction of movement of a web. The distance between the sensors and a web for measuring the temperature of the web, when the housing is fixedly installed in relation to the web, may be in the range from about 20 mm up to about 200 mm, suitably in the range from about 50 mm up to about 100 mm. The number of temperature measurements of the sensors may be at least 5 per second, preferably at least 10 per second, and most preferably at least 20 per second. The sensors 3 are arranged in a chamber 6 (see FIG. 4) within the housing 5 and spread along the front side 7a of the housing 5. Additionally, the elongated housing 5 has a rear wall 7b, a top wall 7c, a bottom wall 7d and two side walls 7e, 7f.

The walls 7a-7f of the housing are preferably made of metal, preferably extruded aluminum, in order for the housing 5 to be self-supporting. The shape of the housing 5 may be in form of an elongated body with a quadratic cross-section, preferably with rounded edges. The height (corresponding to height of front wall 7a respectively rear wall 7b) and the width (corresponding to the width of the top wall 7c respectively the bottom wall 7d) of the housing 5 preferably is equal to or greater than 50 mm and less than or equal to 200 mm. The length L of the elongated housing 5 preferably is equal to or greater than 150 mm and less than or equal to 11000 mm.

At one or both of the side walls 7e, 7f of the housing 5, there may be attachment means 8, such as a fixation bracket, intended for attaching the housing 5 by fastening means to a support structure (not shown), for instance a part of a paper-making machine, at a desired position in order to measure the temperature of a web carried by the machine. More attachment means may be provided if necessary.

The sensors 3 are preferably of pyrometer type, and more preferably of bolometer type. Each sensor 3 is connectable to a data bus 9 (more detailed view and description follows from FIG. 4 below) for providing information of the measured temperature to other systems and/or apparatuses. Suitably the data bus 9 is a CAN-bus. The arrangement 1 is controllable by an electronic control unit CU.

As illustrated in the embodiment shown in FIGS. 1-3, a plurality of openings 11 are provided at the front side 7a the housing 9 in front of the positions for the sensors 3, such that each sensor 3 is positioned adjacent each opening 11 (more detailed view and description follows from FIG. 4 below).

Figure 4:
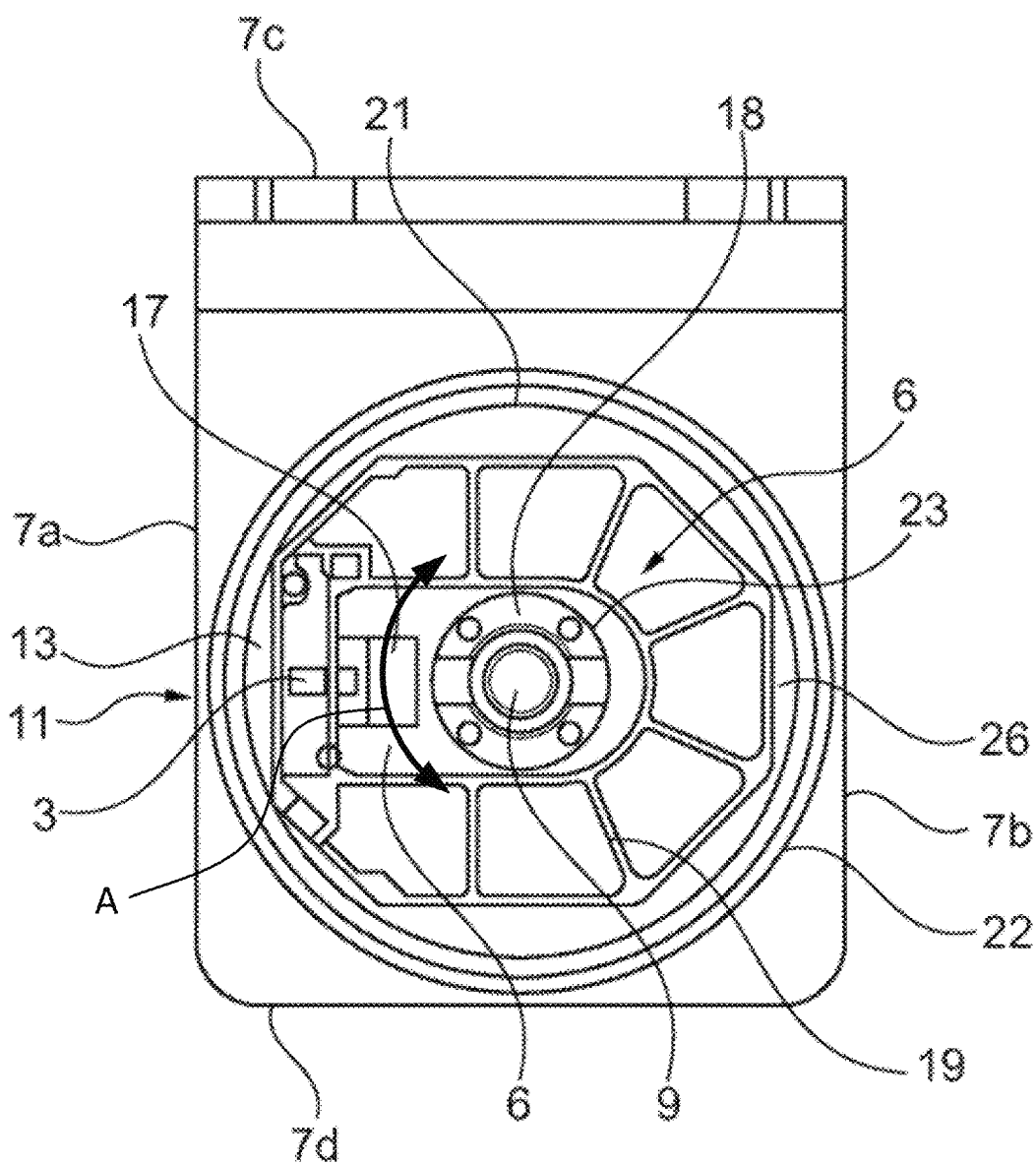
FIG. 4 shows an enlarged view of a cross sectional view A-A in FIG. 3 of the arrangement according to the embodiment in FIG. 1-3.

FIG. 4 shows a cross sectional view of the housing 5 according to the embodiment of the arrangement 1. Suitably, a protecting layer 13 is provided in each opening 11 adjacent each sensor 3 within the housing 5. The protecting layer 13 preferably seals the opening and may be transparent. Preferably, the protecting layer 13 is a filter permeable for infrared temperature radiation. More preferably, the infrared filter is of G9-type, which is a filter designed to let infrared radiation pass within a waveband range from 8 up to 14 micrometers.

There are a plurality of openings 11 (as shown above in FIGS. 2-3) behind each of which there is a respective sensor 3. The number of sensors 3 in a housing 5 according to the embodiment may be up to preferably up to 80, more preferably up to 160 and most preferably up to 320, depending on the length L of the housing for measuring the temperature along a transverse direction of a web. According to this embodiment, the sensors 3 are arranged closely adjacent each other along the front side 7a of the housing 5 such that the sensors 3 simultaneously and continuously measure the temperature of a zone along the front side 7a of the housing. The distance between two adjacent sensors 3 may be equal to or greater than 20 mm and equal to or less than about 300 mm. Preferably, the distance between two adjacent sensors 3 may be equal to or greater than 25 mm and equal to or less than about 50 mm, and most preferably equal to or greater than 30 mm and equal to or less than about 40 mm.

The chamber 6 of the housing 5, wherein the sensors 3 and the data bus 9 are arranged, may be sealed from ambient air. Further, as evident from FIG. 4, the sensors 3 are attached to a circuit board 17 which is connected to the data bus 9. A temperature sensor may also be attached to the circuit board 17 to measure the temperature in the chamber 6 of the housing 5.

According to an embodiment, the chamber 6 be connectable to an air supply 18 and can be provided with an air overpressure. Air can be supplied via a fan or pneumatic air for cooling the chamber 6 and the housing 5. The air supply 18 also decreases the risk for contamination as the overpressure prevents dust from entering the chamber.

In the housing 5, a support construction 19 may be provided for a protection tube 21, having a rotatable shaft 23 in the interior of the housing 5, extending through the chamber 6 of the housing 5. The protection tube 21 is rotatably arranged relative an outer tube 22 fixedly attached to the housing 5. The sensors 3 and the circuit board 17 are attached to the support construction 19. The data bus 9, preferably a CAN-bus communication link, may run in or at the center of the support construction 19 around or in the rotatable shaft 23. On the outside of the housing 5, the rotatable shaft 23 is connected to an actuator 24. By turning the actuator, the shaft 23 rotates the protection tube 21 (arrow A), which rotates inside the fixed outer tube 22.

The protection tube 21 may also have devices for the calibration of the sensors 3. The sensors 3 can be turned to a position away from the openings 11 by rotation of the shaft 23 for calibration purposes or protection of the sensors 3. A lens protection 26 for the sensors 3 may be arranged at a position away from the openings 11 and it can be activated to provide protection to the lens when the arrangement is not in use.

Figure 5:
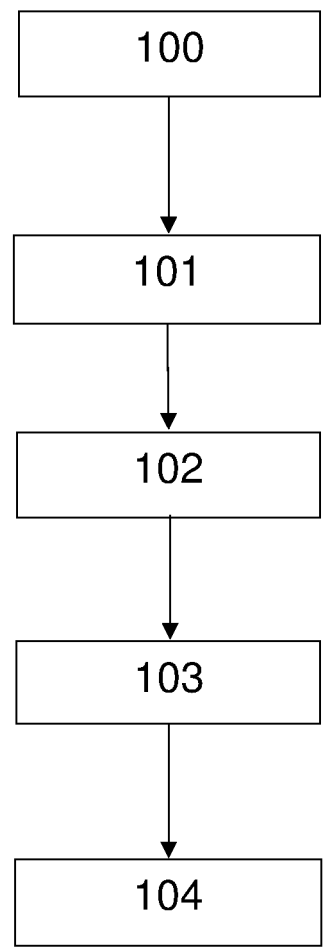
FIG. 5 is a flow diagram, depicting steps in a method of the arrangement in FIGS. 1-4.

Reference is made also to FIG. 5, depicting steps in a method of the arrangement in FIGS. 1-4, involving measuring of the temperature of a web providing information of the measured temperature from the sensors to other systems and/or apparatuses.

The method for measuring of the temperature of a web is carried out by an arrangement 1 comprising a plurality of sensors 3 for contactless measuring of the temperature, as described above with reference to FIGS. 1-4. Further, the arrangement comprises an elongated housing 5 intended for extending essentially along a direction T which is transverse the direction of movement of a web. The sensors 3 are arranged in a chamber 6 within the housing 5 and spread along the front side 7a of the housing 5. Each sensor 3 is connected to a data bus 9.

Before starting the measuring of the temperature of the web, the arrangement 1 is positioned 100 essentially along the transverse direction T. When the manufacturing of the web starts, the sensors 3 starts measuring 101 the temperature of the moving web. Following the start of measuring, or at the same time, information 102 of the measured temperature from the sensors is provided to other systems and/or apparatuses via the data bus 9.

Further, as mentioned above with reference to FIGS. 1-4, the sensors 3 may be attached to a circuit board 17 which is connected to the data bus 9. A plurality of openings 11 may be provided at the front side 7a of the housing 5 at positions for the sensors 3, such that each sensor 3 can be positioned adjacent each opening 11. The sensors 3 and the circuit board 17 may be attached to a support structure 19 having a rotatable shaft 23 in the chamber 6 of the housing 5.

The method may comprise the further steps of rotating 103 the support structure 19 via the shaft 23 such that the sensors 3 are turned to a calibrating position away from the openings 11 and calibrating 104 the sensors 3 at the calibrating position.

The control unit CU is arranged to receive signals from one or more sensors 3, via the data bus 9. Thereby, the signals received by the control unit CU may be indicative of one or more of: the web temperature, the ambient temperature, the distance of the sensors relative to the web to be measured, the position of the sensors within the housing, the web velocity, air supply, scheduled calibration and unscheduled calibration due to malfunction.

The control unit CU is arranged to register and/or process the signals received during at least a part of a production period of a web, preferably the signals received during the whole production period of a web. The processed, or unprocessed signals may be stored to form historic temperature process data.

The control unit CU may also be arranged to adjust for, or during, a temperature measuring process, the control of the arrangement 1, based on the historic data, and current sensor signals.

The control unit may be a computer. The control unit may be connected for communication to one or more control units or computers, e.g. via ethernet, in order to provide information of the measured temperature from the sensors to other systems and/or apparatuses for controlling for instance drier systems, positioned at various zones along the web, based on the provided information of the measured temperature at the zone of the web from the arrangement 1 according to the embodiment of the invention. Below follow examples of application of the arrangement 1 and the method according to the embodiment of the invention.

When manufacturing coated paper, a coating of adhesive, pigment and water is applied to the surface (or surfaces) of the paper. This coating is usually dried contactlessly with infrared dryers or hot air dryers. When the surface is sufficiently dry, steam heated drying cylinders can also be used for further drying. Due to variations in the moisture content of the paper, temperature and surface weight, as well as variations in the size of the spread coating, a variety of drying needs will arise both transversely and lengthwise of the web. This results in variations in the web temperature, where colder parts indicate higher moisture content and warmer parts indicate lower moisture content, i.e. the web temperature and the moisture content are strongly linked to each other. If no adjustment of the drying occurs to compensate for these variations, this will lead to variations in the final moisture content and usually a need for excessive drying, which requires extra energy. Furthermore, the properties of the paper in subsequent printing in printing presses may be adversely affected by so-called "mottling" (uneven uptake of ink) as a result. By continuously measuring the temperature of the web across and along the web, a zone-divided dryer, for example an infrared dryer, can adjust the drying so that the result becomes more even. It may be appropriate to follow the result in more places along the length of the machine and web for best results. Other drying systems can also be controlled by the temperature information, e.g. air dryers or drying cylinders. An alternative method may be to add moisture to the measured parts which are too dry. By measuring the web temperature continuously with the arrangement 1 and the method according to the embodiment of the invention, it is possible to get sufficient information of the web quality and smoothness, as well as ability to control the drying so that the smoothness is improved.

Coating paper with a barrier coating is intended to seal the paper against the penetration of fat and oil. This type of paper is often used in food packaging. When manufacturing it, it is important that the coating becomes dense without holes. Holes may occur e.g. due to improper drying, where blisters and holes may occur due to steam escaping. By measuring the web temperature continuously with the arrangement 1 and the method according to the embodiment of the invention, it is possible to minimize this risk by carefully controlling the web temperature at one or more places in the process and by means of the information control the drying as well as possible.

When dewatering paper in the press section of a paper machine, the result is dependent on the temperature of the paper. At higher temperatures, the viscosity of the water decreases, and more water will be forced out. The arrangement 1 and the method according to the embodiment of the invention can be used to measure the temperature of the web and thereby receive information of the press result. It is also possible to control a zone-divided heating device, e.g. a so-called steam box or an infrared dryer to change the temperature profile.

When a coating is surface dry, the surface temperature will rise faster than if the surface is still moist. If the drying is done evenly across the path, the parts that have the least amount of spread coating (i.e. lowest water content) will dry first and thus become warmer. This shows when an applied coating is unevenly applied. By use of the arrangement 1 and the method according to the embodiment of the invention for measuring the temperature, the temperature information can be used to even out the coating profile, using a suitable device to distribute the coating more evenly.

Many types of paper are further processed e.g. by calendering, to achieve better surface smoothness, smoother thickness or a different gloss by passing the paper between two or more rollers, where the distance between the rollers controls the result. The results are affected, among other things, by the temperature of the web and indirectly the temperature of the rollers across the web. A higher temperature in some points will increase the diameter of the rollers and thereby increase the calendering at these points. Information about the temperature of the web in different parts of the process is therefore important and the arrangement 1, as well as the method, according to the embodiment of the invention for measuring the temperature can be used to improve the process.

By use of the arrangement 1 and the method according to the embodiment of the invention, the temperature lengthwise, i.e. in the direction of movement of the web, can be measured very quickly. Then, it may be possible to capture and analyse periodic fluctuations in the web temperature. If a temperature variation is measured with an analysable regularity, it may indicate sources of error in the machine, e.g. a clogged press felt or incorrect drying cylinder.

Examples of positioning of the arrangement 1, according to the embodiment of the invention, are: before and after an infrared dryer, an air dryer, or a drying cylinder. Thus, the change of web temperature over the drying system can be measured and the dryer effect can be controlled based on the information. A zone-divided infrared dryer can be conveniently controlled with the same number of zones as corresponding to the measuring points. The measuring beam can be placed before the inlet to a calender, over one of the rollers in a calender or at the calender outlet. The temperature information can be used to control the process or equipment used to control the cross-section with respect to e.g. smoothness or thickness during calendering.

It is to be understood that the present invention is not limited to the embodiments described above and illustrated in the drawings; rather, the skilled person will recognize that many changes and modifications may be made within the scope of the appended claims.

The invention claimed is:

1. An arrangement for measuring temperature of a web, the arrangement comprises a plurality of sensors for contactless measuring of the temperature, a housing intended for extending along a transverse direction (T) which is transverse to the direction of movement of the web, characterized in that the sensors are arranged in a chamber within the housing and spread along a front side of the housing, and that each sensor is connected to a data bus for providing information of the measured temperature to other systems and/or apparatuses, a plurality of openings are provided at the front side of the housing at positions for the sensors, such that each sensor is positioned adjacent to an opening, wherein the sensors are attached to a circuit board which is connected to the data bus, the sensors and the circuit board are attached to a support structure having at least one rotatable shaft in the interior of the housing, and wherein the shaft is arranged to rotate the support structure such that the sensors are displaced to a calibration and/or protection position away from the openings for calibration and/or protection of the sensors.

2. The arrangement according to claim 1, wherein a protecting layer is provided in each opening adjacent to each sensor within the housing.

3. The arrangement according to claim 2, wherein the protecting layer is a filter permeable for infrared temperature radiation.

4. The arrangement according to claim 3, wherein filter is permeable for infrared temperature radiation within a waveband range from 8 to 14 micrometers.

5. The arrangement according to claim 1, wherein the sensors are of pyrometer type.

6. The arrangement according to claim 1, wherein the chamber of the housing, wherein the sensors and the data bus are arranged, is sealed from ambient air.

7. The arrangement according to claim 6, wherein the chamber is provided with an overpressure.

8. The arrangement according to claim 1, wherein the sensors are arranged adjacent to each other along the front side of the housing such that the sensors simultaneously and continuously measure the temperature of a zone along the front side of the housing.

9. A method for measuring temperature of a web from an arrangement comprising a plurality of sensors for contactless measuring of the temperature, a housing intended for extending along a direction (T) transverse to a direction of movement of the web, wherein the sensors are arranged in a chamber within the housing and spread along a front side of the housing, and that each sensor is connected to a data bus, the sensors are attached to a circuit board which is connected to the data bus, wherein a plurality of openings are provided at the front side of the housing at positions for the sensors, such that each sensor is positioned adjacent to each opening, wherein the sensors and the circuit board are attached to a support structure having a rotatable shaft in the chamber of the housing, the method comprising the steps of:

positioning the arrangement along the transverse direction (T);
measuring the temperature of the moving web by the sensors;
providing information of the measured temperature from the sensors to other systems and/or apparatuses via the data bus;
rotating the support structure via the rotatable shaft such that the sensors are turned to a calibration position which is away from the openings; and
calibrating the sensors at the calibrating position.

* * * * *